Patented May 21, 1935

2,001,986

UNITED STATES PATENT OFFICE 2,001,986

BISMUTHO-BENZENE-ARSONIC-STIBONIC ACID COMPOUNDS AND PROCESS OF MAKING THEM

Karl Streitwolf, Frankfort-on-the-Main, Alfred Fehrle, Bad Soden on Taunus, and Walter Herrmann, Paul Fritzsche, and Robert Schnitzer, Frankfort-on-the-Main, Germany, assignors to Winthrop Chemical Company, Inc., New York, N. Y., a corporation of New York No Drawing. Application February 6, 1931, Serial No. 514,065. In Germany February 15, 1930

16 Claims. (Cl. 260—14)

The present invention relates to new bismuth compounds of the benzene series and to a process of preparing them.

More particularly our present invention relates to new bismuth compounds of benzene arsonic acid-stibonic acids which are obtainable by reacting benzene arsonic acid-stibonic acids (cf. "Berichte der deutschen chemischen Gesellschaft" vol. 57, page 1143) of the general formula

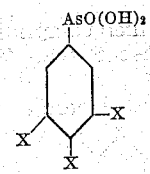

wherein one X stands for SbO(OH)$_2$ and the other X's stand for hydrogen, hydroxyl, oxycarboxylic acid or acylamino with bismuth salts as, for instance, bismuth nitrate or bismuth chloride and to the process of making them. The reaction is preferably carried out by dissolving the benzene arsonic acid-stibonic acid in an alkaline solvent as, for instance, sodium hydroxide and by adding to the solution thus obtained the bismuth salt if desired in the presence of an organic diluent as, for instance, glycerin. The metal salt of the new product thus obtainable is purified by usual methods and may be precipitated by an organic solvent as, for instance, alcohol. The free acid is obtainable by treating the metal salt with an acid.

Our new compounds show valuable therapeutic properties as, for instance, when used as remedy for blood parasites. For therapeutic purposes we prefer to suspend our new compounds in oil or to dissolve their alkali salts in water.

In both their prophylactic and therapeutic action they are, when applied for curing rabbit syphilis, superior to the bismuth compounds hitherto known. 100 mg of the substance, for instance, obtained according to Example 1 calculated upon 1 kilogramme of rabbits completely prevent any syphilis infection even after 39 days. 5 to 10 milligrammes suffice for making a chancre disappear generally after 7 days, whereas when using other bismuth preparations this happens only after 18 days.

The following examples illustrate the invention:—

1. 212 grammes of 4-hydroxybenzene-3-stibonic acid-1-arsonic acid of the probable formula

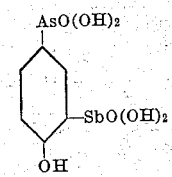

(cf. Schmidt "Berichte der deutschen chemischen Gesellschaft" vol. 57, page 1143) are dissolved in 1 liter of water together with 160 cc. of caustic soda solution of 40° Bé. While strongly stirring, a solution of 243 grammes of bismuth nitrate in 250 cc. of glycerine and 400 cc. of water is introduced and after 15 minutes the mixture is rendered weakly alkaline to phenolphthalein by addition of about 70 cc. of caustic soda solution of 40° Bé. The whole is then filtered by suction to eliminate a small amount of bismuth hydroxide, the solution is rendered weakly alkaline by means of acetic acid and the product is precipitated with alcohol. A feebly pink powder is obtained which is readily soluble in water. By means of acetic acid the free bismuth stibonic-arsonic acid can be separated in the form of a jelly. The substance can be used either in the form of a solution of its sodium salt in water or suspended in oil.

2. The alkaline solution obtainable according to Example 1 by causing bismuth nitrate to react with the stibonic acid-arsonic acid is rendered weakly acid with acetic acid and dialyzed through a bag made of regenerated cellulose or parchment paper and immersed in running water until NO$_3$ ions are no longer removed. The solution thus obtained can be sterilized without any decomposition and may be used directly for therapeutic purposes.

3. 23.5 grammes of 3-acetylamino-4-hydroxybenzene-5-stibonic acid-1-arsonic acid of the probable formula

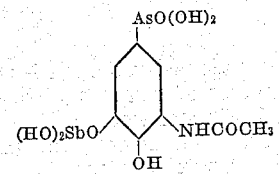

(prepared by diazotizing 3-acetylamino-4-hydroxy-5-aminobenzenearsonic acid and replacing the diazo group by the stibonic acid residue) are acted upon, as described in Example 1, in 50 cc.

of water and 100 cc. of 2N caustic soda solution with 24.3 grammes of bismuth nitrate and 25 cc. of glycerin and 40 cc. of water, and further treated according to Example 1 or 2. The properties of the new compounds are the same as those of the compound obtained according to Example 1.

4. In an analogous manner 24.5 grammes of bismuth nitrate are caused to react with 21.5 grammes of 3-hydroxybenzene-4-stibonic acid-1-arsonic acid of the probable formula

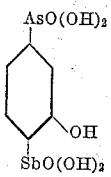

(prepared from 3-hydroxy-4-aminobenzene-1-arsonic acid according to "Berichte der deutschen chemischen Gesellschaft" vol. 57, page 1143). The reaction product is worked up as indicated above. It has the same properties as the products prepared according to the preceding examples.

5. A solution of 24.3 grammes of bismuth nitrate in 25 cc. of glycerin and 30 cc. of water is run while well stirring into a solution of 22 grammes of para-phenylenestibonic acid-arsonic acid of the probable formula

in 70 cc. of water and 60 cc. of 5N caustic soda solution and the whole is further stirred for half an hour. A jellylike magma is obtained which contains the bismuth compound of the stibonic-arsonic acid. It is introduced while stirring into alcohol, the mixture is filtered by suction and the solid matter is washed with alcohol and dried. In order to eliminate inorganic constituents the powder is washed with water, once more dried and then triturated in an oil; it is in this state utilized for the depot treatment. The bismuth compound constitutes a yellowish powder which is decomposed by alkalies with precipitation of bismuth hydroxide.

6. 21.5 grammes of 4-hydroxybenzene-3-stibonic acid-1-arsonic acid of the probable formula

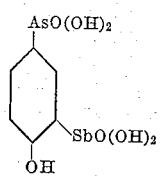

are caused to react, as indicated in Example 1, with 48.6 grammes of bismuth nitrate in 50 cc. of glycerin and 60 cc. of water and worked up as above described. Whereas the preparations obtained according to the preceding examples contain one atom of bismuth for one atom of arsenic and one atom of antimony the ratio of As:Sb:Bi in this preparation is 1:1:2. The compound is a pink powder dissolving in water to an alkaline solution.

7. 15.6 grammes of 1-phenoxy-acetic acid-2-stibonic acid-4-arsonic acid of the probable formula

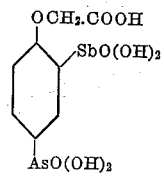

prepared from 2-amino-1-phenoxy-acetic acid-4-arsonic acid by the diazoprocess are dissolved in 100 cc. of normal caustic soda solution. A solution of 16.1 grammes of bismuth nitrate in 16.1 grammes of glycerin and 32 cc. of water is added drop by drop while stirring and the whole is filtered by suction to eliminate the precipitate thereby produced. The precipitate is washed with water, alcohol and ether and then dried.

The formulæ given in the disclosure and in the claims correspond with the results found by analysis but we wish to remark that the arsonic acid or stibonic acid groups in the said products may split off water so that the anhydrous products obtained containing water of crystallization may be identical as to the analysis results with the products corresponding to the formulæ given in this specification.

We claim:

1. The process which comprises causing a solution of a benzene arsonic acid-stibonic acid of the general formula:

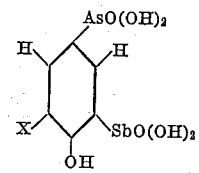

wherein X stands for H or NHCOCH₃, to act upon a solution of an inorganic bismuth salt in the presence of an alkali metal hydroxide.

2. The process which comprises causing a solution of a benzene arsonic acid-stibonic acid of the formula:

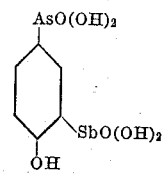

to act upon a solution of one molecular proportion of an inorganic bismuth salt in the presence of an alkali metal hydroxide.

3. The process which comprises causing a solution of a benzene arsonic acid-stibonic acid of the formula:

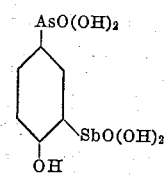

to act upon a solution of one molecular proportion of bismuth nitrate in the presence of sodium hydroxide.

4. The compounds which are obtainable by reacting a benzenearsonic acid-stibonic acid of the general formula:

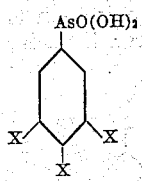

wherein one X stands for SbO(OH)₂ and the other X's stand for hydrogen, hydroxyl, oxycarboxylic acid or acylamino with bismuth salts, said compounds being pink powders.

5. The compounds which are obtainable by reacting a benzenearsonic acid-stibonic acid of the general formula:

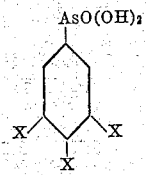

wherein one X stands for SbO(OH)₂ and the other X's stand for hydrogen, hydroxyl, oxycarboxylic acid or acylamino with bismuth salts in the presence of an agent of alkaline action, said compounds being pink powders.

6. The compounds which are obtainable by reacting a benzenearsonic acid-stibonic acid of the general formula:

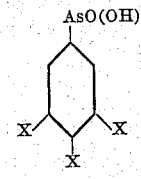

wherein one X stands for SbO(OH)₂ and another X stands for OH, OCH₂COOH or NHCOCH₃ and the remaining X stands for hydrogen with inorganic bismuth salts, said compounds being pink powders.

7. The compounds which are obtainable by reacting a benzenearsonic acid-stibonic acid of the general formula:

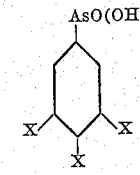

wherein one X stands for SbO(OH)₂ and another X stands for OH, OCH₂COOH or NHCOCH₃ and the remaining X stands for hydrogen with inorganic bismuth salts in the presence of a metal hydroxide, said compounds being pink powders.

8. The process which comprises causing a solution of a benzenearsonic acid-stibonic acid of the general formula:

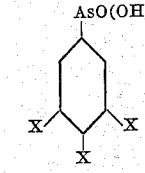

wherein one X stands for SbO(OH)₂ and the other X's stand for hydrogen, hydroxyl, oxycarboxylic acid or acylamino to act upon a solution of an inorganic bismuth salt.

9. The process which comprises causing a solution of a benzene arsonic acid-stibonic acid of the general formula:

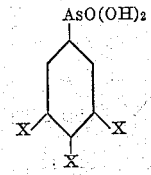

wherein one X stands for SbO(OH)₂ and the other X's stand for hydrogen, hydroxyl, oxycarboxylic acid or acylamino to act upon a solution of an inorganic bismuth salt in the presence of an alkali metal hydroxide.

10. The process which comprises causing a solution of a benzene arsonic acid-stibonic acid of the general formula:

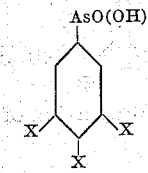

wherein one X stands for SbO(OH)₂ and another X stands for OH, OCH₂COOH or NHCOCH₃ and the remaining X stands for hydrogen to act upon a solution of an inorganic bismuth salt.

11. The process which comprises causing a solution of a benzenearsonic acid-stibonic acid of the general formula:

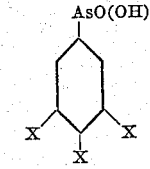

wherein one X stands for SbO(OH)₂ and another X stands for OH, OCH₂COOH or NHCOCH₃ and the remaining X stands for hydrogen to act upon a solution of an inorganic bismuth salt in the presence of an alkali metal hydroxide.

12. The compounds which are obtainable by reacting a benzenearsonic acid-stibonic acid of the general formula

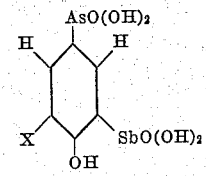

wherein X stands for H or NHCOCH₃ with an inorganic bismuth salt in the presence of an alkali metal hydroxide, being pink powders.

13. The compounds which are obtainable by reacting a benzenearsonic acid-stibonic acid of the general formula

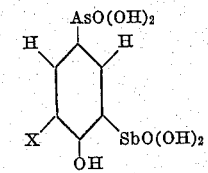

wherein X stands for H or NHCOCH₃, with bismuth nitrate in the presence of sodium hydroxide, being pink powders.

14. The compound which is obtainable by reacting a benzenearsonic acid-stibonic acid of the following formula

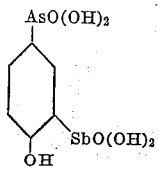

with one molecular proportion of bismuth nitrate in the presence of sodium hydroxide, being a feebly pink powder readily soluble in water.

15. The compound which is obtainable by reacting a benzenearsonic acid-stibonic acid of the following formula

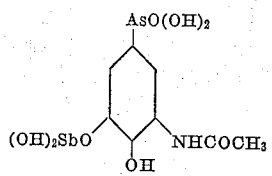

with one molecular proportion of bismuth nitrate in the presence of sodium hydroxide, being a feebly pink powder readily soluble in water.

16. The compound which is obtainable by reacting a benzenearsonic acid-stibonic acid of the following formula

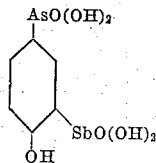

with two molecular proportions of bismuth nitrate in the presence of sodium hydroxide, being a feebly pink powder dissolving in water with alkaline action.

KARL STREITWOLF.
ALFRED FEHRLE.
WALTER HERRMANN.
PAUL FRITZSCHE.
ROBERT SCHNITZER.